Aug. 25, 1936. H. S. JANDUS 2,052,300
AUTOMOBILE BUMPER CONSTRUCTION
Filed Feb. 6, 1933 2 Sheets-Sheet 1
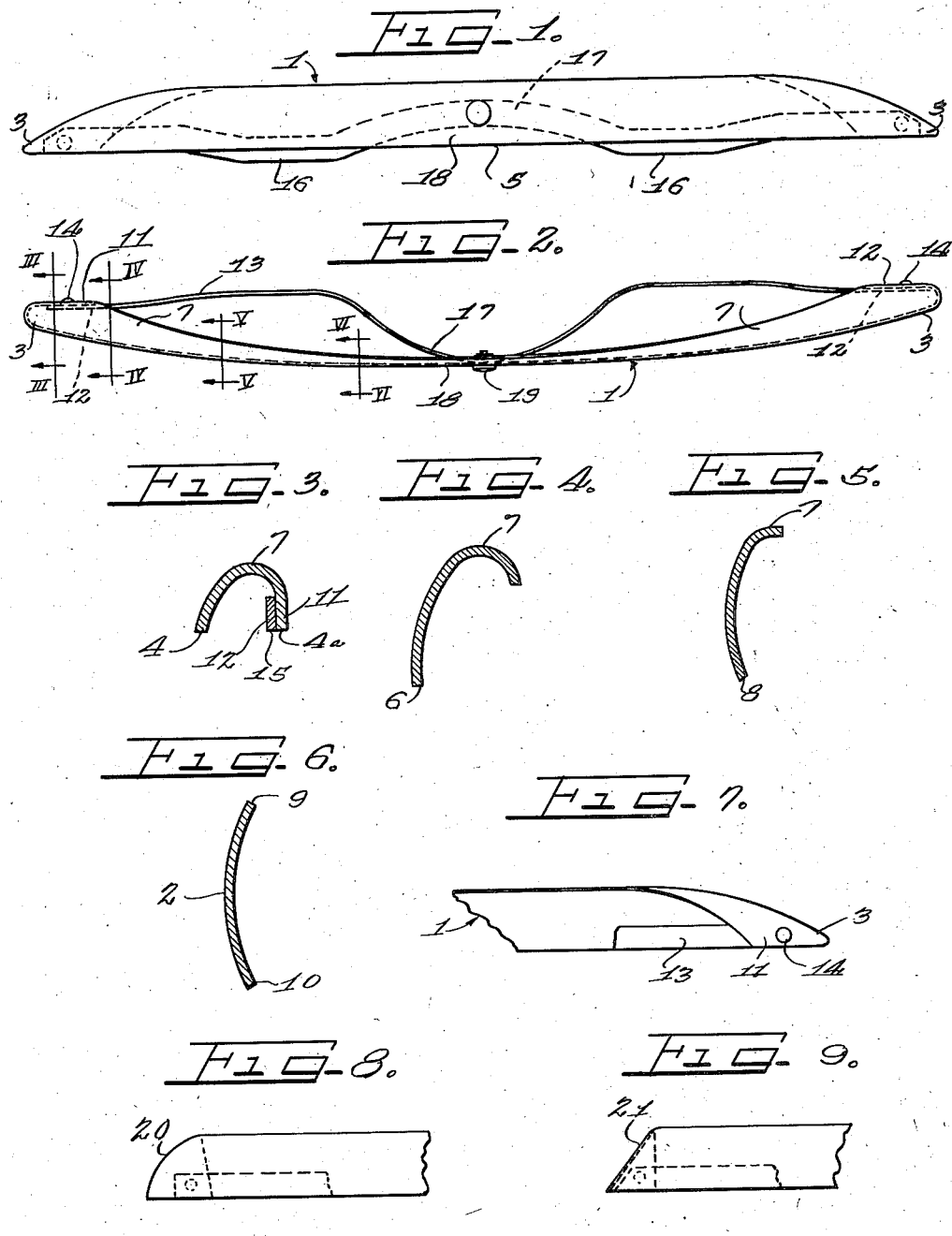
Inventor
HERBERT S. JANDUS.

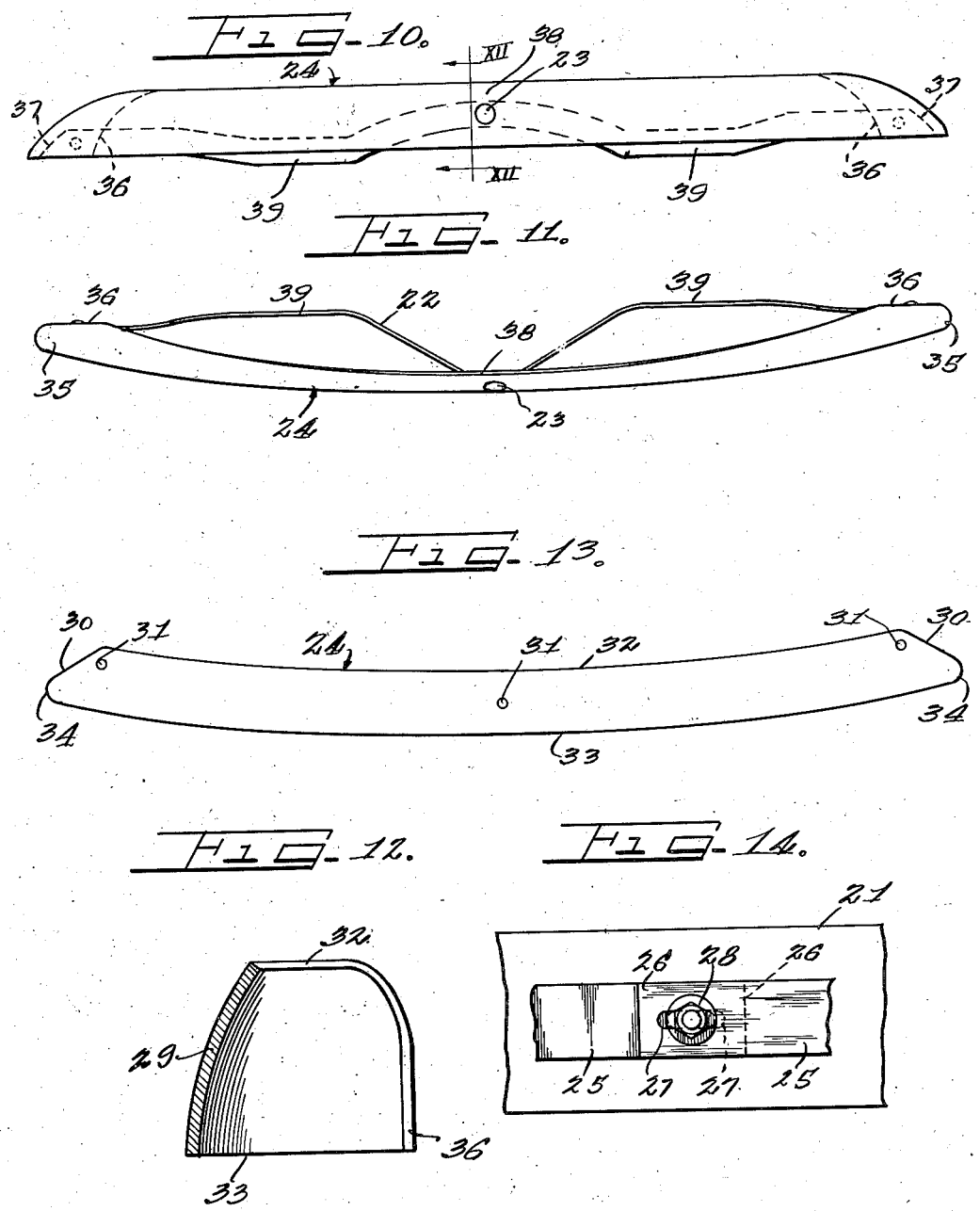

Patented Aug. 25, 1936

2,052,300

UNITED STATES PATENT OFFICE 2,052,300

AUTOMOBILE BUMPER CONSTRUCTION

Herbert S. Jandus, Detroit, Mich., assignor to General Spring Bumper Corporation, Detroit, Mich., a corporation of Michigan Application February 6, 1933, Serial No. 655,353

7 Claims. (Cl. 293—55)

This invention has to do with bumper construction and concerns more particularly bumpers of the single impact bar type.

One of the objects of this invention is to provide an impact bar of pleasing appearance embodying means for substantially concealing the ends of the back bar, and of such construction as to withstand adequately the stresses to which bumpers are ordinarily subjected in use in connection with automobiles and other vehicles.

It is another object of the invention to provide a bumper construction affording both bending and torsional resistance to impacts.

It is a further object of the invention to provide an impact bar having substantially channel-shaped terminals opening downwardly.

A further object of the invention embodies a novel method for constructing an impact bar which is bowed horizontally and has the general appearance of an isosceles trapezoid in elevational contour.

It is a further object of the invention to provide a bumper construction embodying an impact bar whose lower edge is disposed in a horizontal plane and is disposed outermost relative to the entire remainder of the bar.

It is another object of the invention to provide bumper construction embodying impact and back bars whose ends are arranged with their lower edges in the same plane.

It is another object of the invention to provide a bumper construction embodying impact and back bars of resilient material so connected as to substantially conceal the connected parts of the bars and arranged to facilitate the securement of the impact bar at the proper height from the ground.

In carrying out the invention into practice in accordance with one form, a bar of material such as resilient steel of somewhat concavo-convex cross-sectional shape throughout its length has its end portions bent along lines extending generally diagonally from the ends of the lower edge of the bar upwardly and inwardly to the upper edge of the bar, affording substantially channel-shaped ends opening from the bottom.

The bar thus has the appearance in front elevation of a substantially isosceles trapezoid and presents areas in substantially vertical horizontal planes, the latter serving to effectively conceal the ends of the back bar secured thereto. The rearmost flanges of the channel-shaped portions provide means whereby the ends of the back bar are secured to the impact bar, and the parts are preferably arranged so that the entire lower edge of the impact bar, including substantially the entire rim of the channel-shaped terminals, lies in the same horizontal plane when the bumper is attached in proper position on a vehicle. The curvature of the web portions of the channel-shaped terminals is preferably the same throughout in order to facilitate grinding and polishing by a single pass of the grinding or polishing wheel, as the case may be.

In accordance with a further form of the invention, the bar is given the general shape of an incomplete spherical zone throughout its front portion, the ends being similar to the ends of the previously described form of the invention. The lower edge of this bar lies throughout its entirety in a substantially horizontal plane and is of greater dimension than any other portion of the bar, the rearwardly extending return bent portions at the terminals of the bar being attached to the back bar in a manner to conceal the ends of the latter. With this construction, it is apparent that impacts on the bar will result in both bending and torsion of the bar, thereby enabling the same to afford greater resistance and have greater shock absorbing capacity and capacity to resume its original shape when the impact is spent.

The invention involves a novel method of forming a bar, and to this end a substantially straight bar of preferably resilient steel is employed. The bar is bowed to assume generally the shape of a section of a spherical zone, and in order that this may be accomplished, the bar is initially edge bent before the bowing operation. After the bar is edge bent, the same is bowed until the entire lower edge is disposed in the same substantially horizontal plane. The terminals are shaped preferably by die operations, and are perforated at the ends and at the center if desired for the purpose of attaching the back bar.

Further objects and advantages of the invention will appear as the description proceeds.

This invention (in preferred forms) is illustrated in the drawings and hereinafter more fully described.

Figure 1 is an elevation of a bumper constructed in accordance with one form of the invention.

Figure 2 is a plan view of the construction shown in Figure 1.

Figure 3 is a sectional view through the impact and back bars taken substantially in the plane designated by the line III—III in Figure 2.

Figures 4, 5, and 6 are sectional views of the impact bar, taken approximately in the planes designated by the lines IV—IV, V—V and VI—VI, respectively, in Figure 2.

Figure 7 is a fragmentary rear view of the bumper construction appearing in Figures 1 to 6 inclusive.

Figures 8 and 9 are fragmentary elevational views similar to Figure 1 but showing modified forms of the invention.

Figure 10 is an elevation of a further modified bumper construction.

Figure 11 is a plan view of the construction shown in Figure 10.

Figure 12 is an enlarged view, partly in section and partly in elevation, taken substantially in the plane designated by the line XII—XII in Figure 10.

Figure 13 is an elevational view of the impact bar appearing in Figures 10 and 11, at the end of an intermediate step in the method of forming the same.

Figure 14 is a rear view of a modified back bar construction.

Referring now more particularly to the drawings, an impact bar made in accordance with one form of the invention is designated by the numeral 1 and is preferably constructed of resilient bar steel although any other material meeting the requirements of a bumper may be employed for this purpose. The bar 1 in its finished form as shown in Figures 1 to 7 inclusive has generally the shape of a bow when viewed from the top, for example, and is, in elevation, in the form generally of an isosceles trapezoid with its base lowermost. The bar 1 may be formed of a flat bar although preferably the bar is given a slightly arcuate shape in cross section as shown at 2.

In the manufacture of the impact bar 1, the bar stock is initially straight with the center of the bar held substantially rigidly. A twist is imparted to each end of the bar until said end is bent rearwardly about an imaginary line extending diagonally from the extremity of the lower edge of the bar to the upper edge of the bar, thereby providing in effect a flap which is return bent and which, throughout a portion of its length from the extremity of the lower edge of the bar toward the center of the bar, is channel shaped in cross section and of gradually increasing depth with its web uppermost. The web constitutes a rearwardly extending flange which disappears as it approaches the center of the bar. The lower edge of the flap is formed so that it is in the same plane with the original lower edge of the bar. The bar 1 also is bent in a horizontal plane into the shape of a bow, and this step may be performed before or after the end flaps are formed as just described. The edges originally serving to connect the upper and lower edges of the bar are, when the bar is thus formed as an impact member, located horizontally in the same plane as the lower edge of the bar as just pointed out, and the adjacent portions of what was originally the upper edge of the bar, instead of being substantially horizontal, are arranged in a generally up and down direction since they join the upper and lower edges of the bar. By reason of this construction, the cross sectional shape of the bar varies from the substantially inverted U-shape in the body of each terminal 3 with the edge portion 4 of the lower edge 5 foremost, to the substantially hook shape of Figure 4 with the lower edge portion 6 substantially foremost, to the shape shown in Figure 5, wherein the upper portion 7 extending rearwardly from the bar 1 is less pronounced than in Figures 3 and 4 and the edge 8 of the front portion is not foremost, to the substantially untwisted portion adjacent the center of the bar, this portion having its upper edge 9 and lower edge 10 arranged in substantially the same vertical plane as shown in Figure 6.

The rearwardly bent portions 7 constitute the webs of the channel shaped terminals 3, the rear flanges 11 of which serve as the means by which the ends of the impact bar 1 are connected to the ends 12 of the back bar structure 13. It will be observed that when the ends are attached by rivets 14 or any other suitable instrumentalities, and are positioned within the terminals 3, said ends 12 of the back bar structure 13 are concealed by the terminals 3. This construction affords a substantial improvement in appearance over those heretofore in vogue wherein the entire ends of the back bar structure and means for securing the same have been clearly visible, thereby materially detracting from the appearance of the bumper and of the car in connection with which the same has been used. The back bar structure 13, which is preferably secured with its lower edge 15 substantially flush with the lower edge 4a of the rear flange 11 of the terminal 3, is formed with downward bends 16 intermediate the ends and center thereof, for attachment to the chassis frame horns (not shown), and is return bent forwardly and edgewise at 17 for attachment to the central portion 18 of the impact bar 1, as by the bolt and nut means 19.

Due to the fact that the ends of the back bar structure 13 are secured adjacent the lower edge of the impact bar 1, the portions 16 of the back bar need not be edge bent to as great an extent as would be the case were the ends of the back bar secured intermediate the upper and lower edges of the back bar, as has heretofore been usual. In most cases nowadays the mounting pads at the end of the automobile frame are only 13, 14, or 15 inches from the ground and the standard height of the center line of bumpers is 17 inches, so that it is necessary to edge bend or offset the back bar of the bumper to such an extent that the center line of the bumper is raised the standard amount above the center line of the mounting pads. In the event that an impact bar of such width that its lower edge is spaced from its center line by a distance substantially equal to the distance between its center line and the bottoms of the mounting pads is employed, and the ends of the back bar attached substantially in the manner herein described, no edge offsetting or bending of the back bar would be necessary where the back bar is attached to the mounting pads.

Figures 8 and 9 show modified end shapes of the impact bar, with the portions folded over of substantially less extent than the corresponding portions of the above described form of the invention, the end contour in Figure 8 being rounded as at 20 and that in Figure 9 being straight as at 21.

The modified impact bar structure appearing in Figures 10, 11, and 12 differs from that appearing in Figures 1 and 2 essentially in that its lower edge constitutes its outermost boundary, substantially all other portions of the impact bar being disposed within the vertical confines of said edge. The portion of the bar visible from the front accordingly is inclined upwardly and rearwardly from the lower edge of the bar. With this construction, the central attaching portion of the back bar 22, together with the shank and nut of the center clamp means 23, are shielded by the rearwardly extending bar 24 from above as well as from the front and ends thereby further enhancing the appearance of the bumper as a whole. The back bar structure 22 may consist of a single bar or may comprise a pair of individual sections 25 having overlapped ends 26 and registering slots 27 through which the shank 28 of the center clamp passes. This construction permits of relative sliding between the sections 25 and the bar 24. Where an edge offset is required in the back bar in order to support the impact bar at the proper height when installed on a car, if the back bar is in one piece, it is necessary to edge bend or offset the same in a bulldozer, and this involves slow operation. By making the back bar in sections, the same may be formed in a press line very rapidly. Where no edge offset is necessary, it is cheaper to form the back bar in one piece since only a single operation in a cambering machine is then required. The slots in the overlapped ends of the sections are provided to allow a certain amount of adjustment and thereby facilitate assembling.

In forming the impact bar 24, a unique method of manufacture is involved. To this end, a straight bar of resilient steel, preferably, of the desired width and length and of either flat or concavo-convex form as shown at 29 is edge bent without substantial distortion of the plane thereof until it assumes a somewhat arcuate shape simulating the development of a portion of a conical or spherical zone, as shown in Figure 13. The upper corners may be cut away as shown at 30 before or after the edge bending operation, and this is true also of the formation of the bolt holes 31 at the ends and center of the bar 24. The bar 24 is then bent into the shape of a portion of a conical or spherical zone, depending on whether the bar employed is cross-sectionally rectilinear or concavo-convex, and during this operation, which may be performed by a cambering machine, the bar, transversely, extends at an angle to the vertical, that is, at an angle to the direction in which it extended before the bending or cambering operation. At the end of that operation, moreover, the upper and lower longitudinal edges 32 and 33, respectively, of the bar 24 are disposed in planes at substantially right angles to the original plane of the bar 24.

In the following operation, the ends 30 of the bar 24 are turned or bent downwardly, that is, toward the plane of the lower edge 33 until the edges thereof and the corner edge portions 34 joining the end and lower edges are disposed in the plane of the lower edge 33 as clearly shown in Figures 10 and 12. There are thus provided substantially channel or pocket shaped terminals 35 opening at the bottom, the rear flange or flap 36 being disposed substantially in a plane at right angles to the lower edge of the bar in order to facilitate its securement to the ends. The overhang of the bar 24 at the center 38 is sufficient to substantially shield from above the center of the back bar structure 22 and associated nut and shank of the center clamp 23 as above described. Thus the portions 39 of the back bar structure, by which the same is secured to the chassis frame bumper mounting parts (not shown), are substantially the only parts of the back bar structure visible either from the front or top when the impact and back bars are assembled. With this construction, it will be seen that impacts upon the bar 24 will result in a torsional as well as a bending stress on the bar, whereby the bar may afford greater resistance to such impacts and also have a greater tendency to resume its normal condition when the stress is removed than would be the case with bumpers heretofore in vogue. The construction of a bumper in accordance with the principles of the present invention involves not only a minimum of parts, but also a minimum of manufacturing operations, thereby involving a low cost of construction. The bumpers made in accordance with this invention, moreover, involve a radical departure from previous bumpers from the standpoint of appearance, and serve to materially enhance the beauty and distinctiveness of cars to which they are applied.

While the major portion of the impact bar is of substantially uniform width, it is to be understood that the same may be made of varying widths throughout its length in accordance with any desirable design without departing from the principles of this invention.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. Bumper construction including a resilient impact bar having substantially channel shaped ends opening at the bottom, for receiving the ends of a back bar so that said ends of the back bar will be concealed from above and the front and rear sides when attached to the ends of the impact bar, and a relatively planar intermediate portion to render the bar flexible.

2. The method of forming an impact bar from a strip of straight bar stock, comprising the steps of edge offsetting said bar into a substantially arcuate form and bending the strip about an axis substantially equidistant from the ends thereof and spaced from said strip until all portions of the center line of said strip are substantially equidistant from said axis, the strip thus being shaped in simulation of a circumferential portion of a conical zone.

3. Bumper construction comprising an impact bar having its terminal portions turned rearwardly and downwardly to form attaching flaps, a back bar having its ends disposed in and concealed by said flaps, means attaching the respective ends together, said back bar comprising a pair of sections whose inner ends overlap each other and are provided with registering slots for the reception of a center clamp shank for securing said ends to the center of the impact bar, and for facilitating assembly of the bars.

4. Bumper construction comprising an impact bar and a back bar, said back bar including portions whereby the same may be attached to a vehicle frame, said portions being disposed out of the horizontal plane of the center line of the impact bar, the ends of said bars being connected, with the ends of the back bar behind the ends of the impact bar, the line between the connections at the ends of the back bar being disposed out of the horizontal plane of the center line of the impact bar, whereby said impact bar, upon receiving an impact, will be subjected to torsional as well as bending stress.

5. Bumper construction comprising a back bar strip, an impact strip, and means connecting the central parts of said strips together, said impact strip being arranged to afford an impact surface at the front thereof and to extend horizontally and so formed that the central portion of its bottom edge is arranged foremost and the central part of the impact strip at said portion extends upwardly and rearwardly from said portion so as to shield the central part of the back bar strip and the rearwardly extending portions of the connecting means from both the top and the front.

6. Bumper construction consisting of an impact bar and a back bar, the ends of said bars being connected, with the ends of the back bar behind the ends of the impact bar, the line between the connections at the ends of the back bar being disposed out of the horizontal plane of the center line of the impact bar, whereby said impact bar, upon receiving an impact, will be subjected to torsional as well as bending stress.

7. Bumper construction including a resilient impact bar having substantially channel shaped ends opening at the bottom and having outer end walls, for receiving the ends of a back bar so that said ends of the back bar will be shielded from above and the front and rear sides and the outer ends when attached to the ends of the impact bar, and a relatively planar intermediate portion to render the bar flexible.

HERBERT S. JANDUS.